(12) United States Patent
Cosma

(10) Patent No.: US 10,944,714 B1
(45) Date of Patent: Mar. 9, 2021

(54) MULTI-FACTOR DOMAIN NAME RESOLUTION

(71) Applicant: Amazon Technologies, Inc., Seattle, WA (US)

(72) Inventor: Ciprian Dan Cosma, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 7 days.

(21) Appl. No.: 16/385,950

(22) Filed: Apr. 16, 2019

(51) Int. Cl.
*H04L 12/14* (2006.01)
*H04L 29/06* (2006.01)
*H04L 29/12* (2006.01)

(52) U.S. Cl.
CPC .......... *H04L 61/1511* (2013.01); *H04L 61/10* (2013.01); *H04L 61/6059* (2013.01)

(58) Field of Classification Search
CPC ... H04L 61/1511; H04L 61/10; H04L 61/251; H04L 61/2514; H04L 61/255; H04L 61/6059
USPC ......................................................... 709/245
See application file for complete search history.

(56) References Cited

U.S. PATENT DOCUMENTS

| | | | |
|---|---|---|---|
| 6,016,512 A | 1/2000 | Huitema | |
| 6,249,801 B1* | 6/2001 | Zisapel | G06F 9/505 718/105 |
| 6,263,368 B1* | 7/2001 | Martin | H04L 29/06 709/224 |
| 6,298,341 B1 | 10/2001 | Mann et al. | |
| 6,493,765 B1 | 12/2002 | Cunningham et al. | |
| 7,082,476 B1* | 7/2006 | Cohen | H04L 29/12009 709/246 |
| 7,228,359 B1* | 6/2007 | Monteiro | H04L 29/12066 709/228 |
| 7,299,491 B2 | 11/2007 | Shelest et al. | |
| 7,461,147 B1* | 12/2008 | Mowat | H04L 29/12066 709/225 |
| 7,600,011 B1* | 10/2009 | Urbanek | H04L 29/12066 709/203 |
| 8,250,219 B2 | 8/2012 | Raciborski et al. | |
| 8,463,915 B1* | 6/2013 | Kim | H04L 67/1036 709/227 |
| 8,521,908 B2 | 8/2013 | Holmes et al. | |
| 9,276,902 B2 | 3/2016 | Treuhaft et al. | |
| 9,817,730 B1* | 11/2017 | Howard | G06F 11/1474 |
| 2017/0171206 A1* | 6/2017 | Joffe | H04L 61/2007 |
| 2018/0097831 A1* | 4/2018 | Uppal | H04L 45/20 |

OTHER PUBLICATIONS

P. Mockapetris, ("Domain Names-Implementation and Specification") Nov. 1984, pp. 1-55.
S. Thomson et al, ("DNS Extensions to Support IP Version 6") Oct. 2003, pp. 1-8.
Developer Guide, ("Amazon Route 53"), API Version Jan. 4, 2013, pp. 1-526.

* cited by examiner

*Primary Examiner* — Ruolei Zong
(74) *Attorney, Agent, or Firm* — Robert C. Kowert; Kowert, Hood, Munyon, Rankin & Goetzel, P.C.

(57) ABSTRACT

A request for a network address corresponding to a domain name is received. From a plurality of network addresses associated with the domain name, a network address is identified based at least in part on a request-property-based address selection criterion. The network address is included in a response to the request.

20 Claims, 9 Drawing Sheets

Example contributory factors influencing name resolution 200

- Request sequence-based address difference criteria 210
- Address subset proportionality criteria 212 (e.g., 90% to address-subset A, 10% to address-subset B)
- Repeatability requirements 214
- Name-to-address mapping lifetime (time-to-live (TTL)) preferences 216
- Requester identity-based criteria 218
- ...

- Destination health-based criteria 250
- Destination latency-based criteria 252
- Destination location-based criteria 254

- Relative priorities 270
- Name resolution history records 272

FIG. 2

```
┌─────────────────────────────────────────────────────────────────────────────┐
│ A set of network addresses (e.g., IPv6 addresses) for a destination resource│
│ collection is obtained, e.g., as part of a configuration of an application  │
│ with a domain name "www.<some-name>.com" to be deployed using provider      │
│ network resources   801                                                     │
└─────────────────────────────────────────────────────────────────────────────┘
                                      │
                                      ▼
┌─────────────────────────────────────────────────────────────────────────────┐
│ A request to configure resolution policies/rules for the domain name is     │
│ received, e.g., at a multi-factor domain name resolution service (MDNRS);   │
│ the request parameters (which may be stored at an MDNRS repository) may     │
│ indicate the domain name, a set of addresses, one or more request sequence  │
│ based address selection criteria/rules, one or more destination property    │
│ based address selection criteria/rules, and/or lifetime preferences for the │
│ name-to-address mappings, etc.   804                                        │
└─────────────────────────────────────────────────────────────────────────────┘
              │                                           │
              ▼                                           ▼
┌──────────────────────────────────┐    ┌────────────────────────────────────┐
│ In response to change requests,  │    │ A request to provide one or more   │
│ the stored rules associated with │    │ network addresses corresponding to │
│ the domain name may be modified  │    │ the domain name is received    808 │
│ over time    807                 │    │                                    │
└──────────────────────────────────┘    └────────────────────────────────────┘
              │                                           │
              ▼                                           ▼
┌─────────────────────────────────────────────────────────────────────────────┐
│ Based on the current set of policies/rules in effect, e.g., using a         │
│ combination of a current request sequence based policy and a current        │
│ destination property based policy, one or more addresses from the current   │
│ set of addresses are selected   810                                         │
└─────────────────────────────────────────────────────────────────────────────┘
                                      │
                                      ▼
┌─────────────────────────────────────────────────────────────────────────────┐
│ The selected address(es) are transmitted to the requester   813             │
└─────────────────────────────────────────────────────────────────────────────┘
```

*FIG. 8*

MULTI-FACTOR DOMAIN NAME RESOLUTION

BACKGROUND

Many companies and other organizations operate computer networks that interconnect numerous computing systems to support their customer-facing applications and services, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers to implement the applications or services.

In order to allow a given application or service to be accessed over the Internet (for example, via a browser or similar easy-to-use interfaces, or from other programs or applications), a user friendly name referred to as a domain name (e.g., "www.<some-name>.net") may be associated with the application or service. When a user enters the domain name into a browser, the name may have to be mapped to a network address associated with a resource such as a server at which requests directed to the application or service will be processed. This mapping procedure is referred to as domain name resolution, and may in some cases involve the use of a number of different name servers or name resolvers operating in accordance with Domain Name System (DNS) standards. After the mapping is obtained, a request from the user can be directed to the resolved network address, and the requested actions can be performed on behalf of the user.

BRIEF DESCRIPTION OF DRAWINGS

FIG. 2 illustrates example factors which may influence name resolution decisions, according to at least some embodiments.

FIG. 8 is a flow diagram illustrating aspects of operations that may be performed to implement multi-factor name resolution, according to at least some embodiments.

Figure 1:
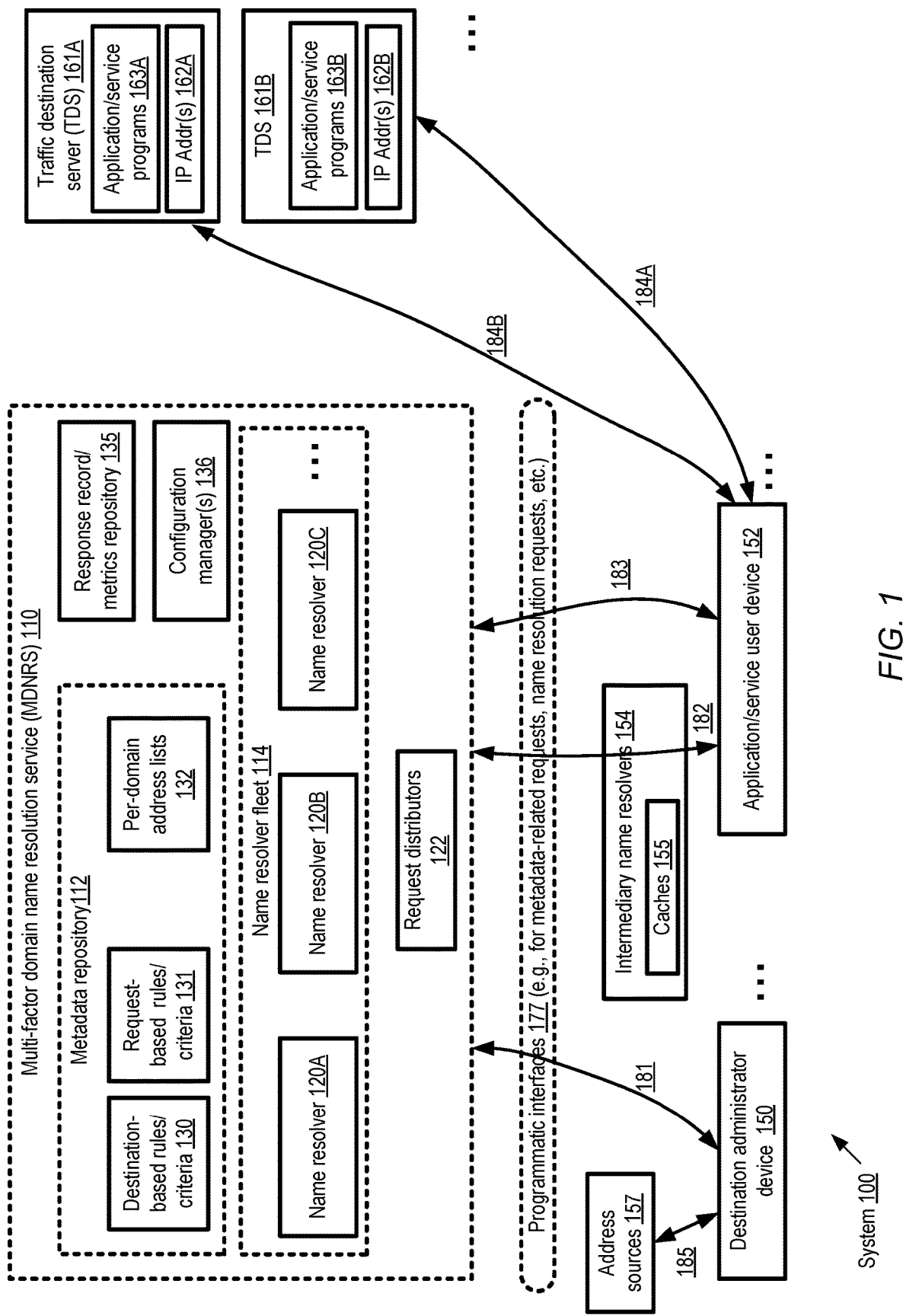
FIG. 1 illustrates an example system environment in which a multi-factor domain name resolution service may be implemented, at which a combination of destination-based and request-based name resolution rules may be used, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for implementing a rich variety of policies for domain name resolution, including for example client-specified policies that take request sequencing and other characteristics of domain name requests into account. In some cases, a combination of the properties of a given domain name resolution request or requester, as well as characteristics of the back-end destination resources at which an application or service associated with the domain name, may be considered in combination when selecting an address from a collection of addresses corresponding to the domain name. For example, in response to a name resolution request, in some embodiments a first subset of addresses associated with a domain name may be selected based on considerations such as collected metrics of destination resource health or destination response latency, and then one or more addresses to be provided to the requester may be selected from the first subset based on request sequence considerations (e.g., ensuring that a minimum difference exists between respective addresses provided for the domain name). A given name resolution policy to be implemented for a given domain name may comprise one or more rules in some embodiments, with individual ones of the rules corresponding to respective criteria. In some embodiments, the kinds name resolution rules or policies described herein may help to enhance the security of applications and/or services associated with a domain, e.g., by making it harder for malicious entities to launch multi-address denial of service attacks. The name resolution techniques may also help facilitate smooth transitions among versions of software and/or hardware stacks at the back-end destination resources in some embodiments. The techniques described may be especially useful in environments in which a large number of network addresses (e.g., a collection of Internet Protocol Version 6 (IPv6)) addresses are assigned to a given domain, although the described methodology may be applied with equal success regardless of the particular network protocol or addressing scheme being used. In at least some embodiments, the techniques described herein may be implemented in accordance with widely used Domain Name System (DNS) standards and/or minor extensions of such standards.

According to some embodiments, the name resolution rules, policies and algorithms described herein may be implemented at a network-accessible service, e.g., at a provider network or cloud computing environment. Because of the variety of considerations taken into account at the service to resolve domain names, such a service may be referred to as a multi-factor domain name resolution service (MDNRS). In one embodiment, some of the policies implemented at an MDNRS may be stateless (that is, records of previous name resolution requests/responses may not have to be considered when responding to a new name resolution request), while other policies may be stateful (that is, records of name resolution requests/responses may be stored and used when responding to new requests). In other embodiments, only stateless policies may be implemented, or only stateful policies may be implemented. In one embodiment, a system may comprise one or more computing devices of a network-accessible name resolution service. The devices may include instructions that upon execution on or across one or more processors cause the devices to store, corresponding to a domain name associated with one or more network traffic destinations, (a) a plurality of network addresses associated with the domain name, (b) one or more destination-property-based address selection rules, and (c) one or more request-sequence-based address selection rules. The domain name, associated addresses and rules (or policies indicating how multiple rules are to be used in combination) may, for example, be stored by an administrative or control plane component of the MDNRS in a repository to which one or more name resolvers of the service have access. Individual ones of the name resolvers, which may also be referred to as name servers or DNS servers, may be implemented using a combination of software and hardware in various embodiments. In some embodiments, at least a portion of the metadata associated with a domain name may be stored in records that comply with a version of an industry standard DNS protocol; in other embodiments, the metadata may be stored in records that may not necessarily comply fully with DNS protocols (e.g., the records may represent extensions to DNS protocols). When a request to provide one or more network addresses corresponding to the domain name is received, the stored information corresponding to the domain name may be looked up or retrieved from the repository by the name resolver to which the request is directed, or from a cache accessible from the resolver in some embodiments. From the plurality of network addresses, one or more network address may be selected, e.g., based at least in part on a combination of the destination-property-based address selection rule and the request-sequence-based address selection rule in some embodiments. The selected address or addresses may be provided to one or more destinations, e.g., including the entity from which the name resolution request was received, a log manager of the MDNRS responsible for storing records of the addresses provided to various requesters, and so on in various embodiments.

According to at least some embodiments, a client of the MDNRS may indicate various aspects of the name resolution rules or policies for a domain name via programmatic interfaces such as a set of APIs (application programming interfaces), web-based consoles, command-line tools, graphical user interfaces and the like. In one embodiment, a client may for example indicate one or more factors to be used to resolve a domain name, and the MDNRS may generate a policy comprising a set of rules to be applied based on the specified factor or factors. In some embodiments in which multiple factors are to be considered, the relative importance or priority of the factors may be indicated programmatically by a client. In other embodiments, the MDNRS may utilize a default set of request-based and/or destination-based rules and/or policies if additional guidance is not provided by a client.

In some embodiments, a request sequence based address selection rule may indicate a difference criterion for selecting successive addresses for a given domain name. For example, if address A1 is provided in response to a request R1 processed at time T1 by a particular name resolver, the address A2 provided to the next request R2 received at some time T1+delta at that same name resolver may be required to differ from A1 by a specified minimum. The particular technique or units to be used to compute differences between addresses may vary from one embodiment to another, e.g., based on the addressing scheme being used. For example, consider a scenario in which eight sixteen bit elements E0-E7 are concatenated, separated by dots, to specify an address; thus, a given address may be specified as E0.E1.E2.E3.E4.E5.E6.E7. In such a scenario, one difference criterion for successive addresses, specified by a client or selected by the service, may indicate that at least four of the elements of successive addresses A1 and A2 have to differ, that at least one of the elements of A2 has to be greater than the corresponding element of A1 by some quantity q1, and that at least one of the elements of A2 has to be less than the corresponding element of A1 by some other quantity q2. In some embodiments in which a pool of name resolvers is utilized, and name resolution requests are directed to individual members of the pool based for example on load balancing considerations, such sequencing-based rules may be implemented independently by each of the name resolvers. In other embodiments, a request sequence number may for example be assigned to each received name resolution request at the MDNRS, regardless of the number of name resolvers being used, and such a sequence number may be used to determine the address to be provided in response. In some embodiments, a client may specify or provide one or more mathematical or statistical functions to be used to select or identify an address from a set of addresses associated with a domain name. Input parameters to such functions may include one or more recently-selected addresses and/or a request sequence number in some cases, so that a difference criterion can be implemented. In at least one embodiment, a random selection function may be used to identify a particular address from a set of addresses, e.g., in response to a programmatic request for random selection from a client.

In some embodiments, a client of an MDNRS may obtain a large set of addresses for a collection of destination resources (e.g., servers that implement an application or service of the client, at which service requests from the client's own customers are to be processed). For example, a block of $2^{32}$ or $2^{64}$ IPv6 addresses may be obtained from an address set provider. From among this large number of addresses, a relatively small subset may be used at a given point in time—e.g., if the application has 1024 back-end servers, 1024 addresses may be used. The addresses that are in use during a given time period may be referred to as the valid subset of addresses in some embodiments, as requests directed to the domain name may have to be directed only to such addresses during such time periods for processing or fulfillment; the remaining addresses (which are not part of the valid subset) may be considered at least temporarily invalid. In some embodiments, part of the information provided by a client to an MDNRS may include an indication of the currently valid subset of addresses associated with the domain name, as well as or instead of the full set of addresses designated for the domain name.

In some embodiments, a given domain name may be assigned to an application or service being implemented using a group of servers or other back-end resources, with individual ones of the resources being assigned respective network addresses (or respective sets of network addresses). The back-end resources, at which requests for the application or service are processed (or at least processed in part) may be referred to as destination resources of the domain name. Any of a variety of destination properties may also be taken into account when selecting an address to resolve a domain name resolution request in some embodiments. Such properties may, for example include metrics of the health of servers associated with respective addresses, measured latencies of responses to service requests from the resources associated with respective addresses, and so on. In at least one embodiment, a weighted round-robin policy may be used to select a subset of destination resources. In some embodiments in which a combination of destination-based and request-based factors are taken into account, the destination-based factors may first be utilized to select a subset of addresses of the domain, and the request-based factors may be applied to the selected subset to finalize the one or more addresses of the subset to be returned to the requester.

According to at least one embodiment, records of the respective addresses provided to individual requests and/or requesters may be maintained at the MDNRS. The MDNRS may implement programmatic interfaces that can be used to query such records in some embodiments—e.g., an administrator or a client may be able to determine the addresses that were provided in response to specified requests, or to particular requesters. An administrator or client may also be able to determine, in response to a query indicating a particular destination address, information (e.g., IP addresses) pertaining to the sources of name resolution request to which that particular destination address was provided.

As one skilled in the art will appreciate in light of this disclosure, certain embodiments may be capable of achieving various advantages and practical applications/benefits, including some or all of the following: (a) enhancing the security of applications and/or services associated with domain names, e.g., by preventing or limiting the effectiveness of certain types of network-based attacks such as multi-address denial of service attacks, (b) enhancing the robustness of network-accessible applications or services by facilitating gradual transitioning of external clients from one version of software/hardware to another, (c) enabling finer-grained debugging and analysis of client requests directed at network-accessible services and applications, e.g., by recording the specific unique addresses provided to individual requests and the times at which the addresses were provided by a name resolver.

Example System Environment

FIG. 1 illustrates an example system environment in which a multi-factor domain name resolution service may be implemented, at which a combination of destination-based and request-based name resolution rules may be used, according to at least some embodiments. As shown, system 100 includes resources and artifacts of a multi-factor domain name resolution service (MDNRS) 110 as well as a set of network traffic destination servers (TDSs) 161 (such as TDS 161 and TDS 161B) that are configured to process messages and requests directed to domain names resolved to network addresses at the MDNRS in the depicted embodiment. At a high level, MDNRS 110 may be responsible for implementing various types of customizable client-specified or client-approved rules or policies for mapping domain names of services or applications implemented at the traffic destination servers to corresponding network addresses. Such mappings may enable requests for such services or applications to be directed via one or more networks to the traffic destination servers.

An MDNRS 110 may implement one or more sets of programmatic interfaces 177 in some embodiments, which may be used by MDNRS clients of several types to submit requests (e.g., name resolution rule/policy administration or configuration related requests, name resolution requests, and the like) and receive corresponding responses. The programmatic interfaces 177 may include, for example, various application programming interfaces (APIs), command-line tools, web-based consoles, graphical user interfaces and so on.

One category of MDNRS clients may comprise administrators of the traffic destination servers. Such administrators may also be referred to as domain administrators in some embodiments. The administrators may issue programmatic requests from a first set of computing devices, referred to as destination administrator devices 150, in the depicted embodiment. A second category of MDNRS clients may comprise application/service end users. Requests from such entities to obtain network addresses of the traffic destination servers may be submitted from a different set of computing devices 152 in some embodiments (although of course in some cases a destination administrator may also submit name resolution requests). A destination administrator may be responsible for setting up the application or service whose requests are to be processed using programs 163 (e.g., 163A or 163B) running at the traffic destination servers 161, configuring networking properties of the traffic destination servers, and/or ensuring that information to be used to generate domain name to address mappings for the applications/services is provided to the MDNRS 110 in some embodiments. As such, a destination administrator may obtain a set of network addresses (e.g., IPv6 addresses, IPv4 addresses, or addresses expressed in accordance with some other protocol or standard) for a domain name such as "www.<servicename>.com" from an authorized address source 157 in the depicted embodiment, as indicated by arrow 185. In some embodiments as discussed below in further detail, the addressing scheme and the network protocol being used may enable a large number of network addresses to be assigned to a given domain name, of which at a given point in time only a subset may be used.

The destination administrator may configure the networking properties of traffic destination servers 161 in various embodiments. The configuration tasks may include for example assigning groups of one or more IP addresses 162 (e.g., IP addresses 162A for TDS 161A, and IP addresses 162B for TDS 161B), selected from the set of addresses obtained from an address source 157, to respective ones of the traffic destination servers 161. The subset of addresses that are assigned to the TDSs 161 of a service or application at a given point in time may be referred as the valid subset of the addresses obtained from the source 157 for the corresponding domain name in some embodiments. In some embodiments, in order to enable messages directed at the network addresses 162 to be routed to the appropriate traffic destination server, one or more messages prepared in accordance with a gateway protocol such as BGP (Border Gateway Protocol) and/or a routing protocol such as OSPF (Open Shortest Path First) may be transmitted to networking intermediary devices such as routers, switches, gateways and the like. In at least one embodiment in which the traffic destination servers 161 are implemented at compute instances (e.g., virtual machines) of a virtualized computing service of a provider network, the network addresses 162 may be assigned to virtual network interfaces (VNIs) that are programmatically attached to the compute instances. A given traffic destination server 161 may be assigned multiple network addresses 162 in the depicted embodiment using any of a variety of approaches, e.g., using one or more virtual network interfaces (individual ones of which may in turn be assigned multiple IP addresses), multiple physical network interface cards with a single IP address each, or simply by advertising multiple IP addresses for the server using a routing protocol or gateway protocol.

In order to enable the MDNRS 110 to generate mappings between the domain name associated with application/service programs 163 and the network addresses 162 to which requests for such applications or services should be sent, the destination administrators may provide various types of information to the MDNRS via programmatic interfaces 177 in the depicted embodiment, as indicated by arrow 181. Such information may include, for example, the set of network addresses associated with a given domain name along with one or more policies, rules or criteria to be taken into account when resolving the domain name in various embodiments. A metadata repository 112 of the MDNRS 110 may include per-domain address lists 132 in the depicted embodiment, comprising respective records indicating all the network addresses (or at least the currently valid network addresses) of individual domains. In some embodiments, at least two types of rules or criteria may be stored in the metadata repository 112 of the MDNRS 110, e.g., by configuration managers 136 comprising one or more computing devices used for administrative tasks of the MDNRS. Destination-based rules/criteria 130 may, for example, indicate whether or how properties of individual ones of the TDSs 161 associated with the domain are to be used to select the addresses provided in response to domain name resolution requests, while request-based rules/criteria 131 may indicate whether or how properties of individual name resolution requests are to be used to select the addresses. In one example of destination property based name resolution, server-health related metrics may be obtained from individual ones of the TDSs 161, and a recently-collected set of such health metrics may be used to down-select the set of TDSs whose addresses may be used to respond to a given name resolution request. In one example of a request-based name resolution policy, the MDNRS 110 may ensure that in response to respective requests to resolve a given domain name, the addresses provided meet a minimum difference criterion (with respect to at least some recently-provided addresses) as such, the addresses provided may be determined at least partially based on the request sequence. Examples of a variety of factors or criteria that may be considered singly or in combination at the MDNRS when making address selection decisions are discussed in further detail below in conjunction with the description of FIG. 2.

Other types of configuration-related parameters and preferences may be specified from destination administrator devices 150 to the MDNRS 110 in at least some embodiments. For example, in one embodiment, a destination administrator 150 may indicate that records of the addresses provide to different name resolution requesters be maintained at the MDNRS 110, and that such records be made available to authorized users (e.g., for debugging instances of application/service programs 163, or for other types of analysis). Such records may be generated and stored in a response record/metrics repository 135 in the depicted embodiment. In one embodiment, for each address provided in response to a domain name resolution request, a record identifying the requester (e.g., indicating the IP address of the requester or a client identifier assigned to the requester by the MDNRS), and/or other properties of the request such as a request timestamp indicating when the request was received/processed, may be stored in repository 135. In such an embodiment, in response to a query indicating a given network address of the domain from an authorized entity such as a domain administrator, at least a subset of such information stored in the records may be provided.

The MDNRS 110 may include a fleet 114 of name resolvers 120, e.g., 120A, 120B and 120C in the depicted embodiment, with individual ones of the resolvers 120 being implemented using some combination of software and hardware at one or more computing devices. The name resolver fleet 114 may have one or more request distributors 122 which may be responsible for selecting the particular name resolver 120 to which a given name resolution request is to be directed in some embodiments. Any of a variety of techniques may be used to select the particular name resolver to which a request should be directed in different embodiments—e.g., round-robin selection may be used, load balancing based on metrics of resource utilization at individual name resolvers may be used, and so on.

An application/service user may submit a name resolution request to the MDNRS 110 via programmatic interfaces 177 from a device 152 in one of at least two ways in the depicted embodiment. In the first approach, indicated by arrow 183 in FIG. 1, the user may submit a request directly to the MDNRS 110 indicating a domain name for which an address is desired. In the second approach (indicated by arrow 182), one or more intermediary name resolvers 154 may be used—that is, the request to resolve a domain name may first be sent to an intermediary name resolver 154, and transmitted on to the MDNRS 110 if the intermediary cannot itself resolve the domain name (e.g., using a cache 155 of domain-name-to-address mappings). In at least some embodiments, an intermediary name resolver may for example be implemented at an Internet Service Provider (ISP) being used by an application/service user. In some embodiments, several different types of intermediary name servers, each responsible for maintaining mappings of respective subsets of the hierarchy of possible domain names to corresponding name servers, may be used. For example, when an intermediary name resolver at an ISP first receives a request to resolve a domain name for which information is not available at the intermediary, a corresponding request may be transmitted to a root name server, which may respond with the address of a TLD (top level domain) name server. The term "top level domain" refers to the final element of a multi-element domain name—e.g., for a domain name such as "example.com" ending in ".com", the top level domain is ".com", while for a domain name such as "example.net" ending in ".net" the top level domain is ".net", and so on. The ISP intermediary may then submit the domain name to the TLD domain name server, which may in turn respond with the address of a domain-specific name server, e.g., a name server or name resolver 120 configured specifically for "example.com" or "example.net". The ISP intermediary may then send the domain name to the domain-specific name resolver, get a corresponding address, and provide it to the application/service user device 152. That address may then be utilized to submit requests directed to the traffic destination servers, as indicated by arrows 184A and 184B in the depicted embodiment.

The selection by a given name resolver 120 of the address(es) to be provided in response to a given name resolution request may be based at least in part on a combination of destination-based rules/criteria 130 and request-based rules/criteria 131 in some embodiments. For example, in one embodiment the name resolver 120 may first identify, using metadata repository 112, the set of rules or criteria applicable to the domain indicated in the name resolution request. Then, the applicable rules (if multiple rules apply, and if the domain name can be resolved to any of multiple addresses) may be implemented in order, e.g., based on a relative priority indicated by the destination administrator, successively pruning the set of addresses until all the relevant rules/criteria have been applied. From the addresses remaining after all applicable rules/criteria have been applied, one or more may be provided to the requester in various embodiments. In some embodiments, one or more name resolvers 120 may utilized stored state information (e.g., records of which addresses have recently been used to resolve a given domain name, by the same resolver and/or by other resolvers) when responding to new domain resolution requests—that is, the name resolvers may implement a stateful name resolution policy or technique. Such records may be stored, for example, in repository 135 and/or at the name resolvers themselves, and may be examined by any of the name resolvers as they respond to new name resolution requests. In other embodiments, stateless name resolution techniques may be employed, in which records of earlier responses are not utilized at the name resolvers 120.

The extent of the guidance provided to the MDRNS by a destination administrator with respect to the rules or criteria to be used for name resolution may vary in different embodiments. In one embodiment, for example, the administrator may specify one or more mathematical or statistical functions to be used to select an address from the pool of addresses associated with the domain. In another embodiment, an administrator may indicate a repeatability or idempotency requirement, requesting that when requests from the same requester are received for the same domain name, the same address be provided to each request, and so on. In at least one embodiment, if a destination administrator does not specify any specific rules or criteria to be used for a given domain, a combination of one or more destination property based and request property based rules may be implemented by default by the MDNRS 110. In at least one embodiment, a destination administrator may indicate that a given rule or criterion is mandatory, such that if the rule or criterion cannot be enforced for a particular request (e.g., due to a lack of a sufficient number of distinct addresses that have not been used recently), no address should be provided in response to that request. Similarly, in some embodiments, a destination administrator may indicate that a given rule is an advisory or "best-effort" rule, and that while the MDNRS should enforce the rule as often as possible, occasional violations are acceptable to the administrator.

Example Factors Used for Resolving Domain Names

FIG. 2 illustrates example factors which may influence name resolution decisions, according to at least some embodiments. At least some of the contributory factors 200 shown in FIG. 2 that are to be taken into account with respect to resolving a given domain name may be specified or indicated programmatically by a client of a multi-factor domain name resolution service (MDNRS) similar to MDNRS 110 of FIG. 1 in some embodiments. Other contributory factors may be used as part of a default name resolution policy of an MDNRS. An overall name resolution policy may be generated for a given domain in some embodiments, for example, as a sequence of logical filters or selection operations to be applied to an available set of addresses for the domain, such that individual ones of the filters or selection operations correspond to respective factors of the kind shown in FIG. 2.

In some embodiments, one or more request sequence-based address difference criteria 210 may be applied when generating domain name to address mappings. Such criteria may indicate how addresses to which a given domain name is mapped in response to respective requests should differ from one another. For example, consider a simple scenario in which name resolution requests R1, R2 and R3 are processed in that order at a given name resolver for the same domain D1, and addresses A1, A2 and A3 are provided in response to R1, R2 and R3 respectively. In some embodiments, a difference criterion 210 may indicate, to the name resolver, the minimum extent to which A2 should differ from A1, the minimum extent to which A3 should differ from A2, and so on. In some embodiments, such difference criteria may be specified in scenarios in which (a) a given domain name may be mapped to any of numerous addresses and (b) the administrator of the domain's destinations wishes to prevent name resolution requesters from being able to easily predict or guess addresses to which the domain name is to be resolved. Such an approach may be especially useful in reducing the effectiveness, duration or probability of large scale or multi-address denial of service attacks as discussed below in further detail. In some embodiments, a client of an MDNRS may specify mathematical or statistical functions to be used at the MDNRS to comply with a desired difference criterion (e.g., functions to be invoked to select the next address to be sent to a name resolution requester). In one embodiment, a client may indicate that a random selection function be used to select addresses to be provided.

In at least one embodiment, a client such as a domain administrator may indicate an address subset proportionality criterion 212 to be used at the MDNRS. For example, during some time interval, the client may desire that 90% of the name resolution requests received be fulfilled by providing an address from a subset A of the available valid addresses, and that the remaining 10% of the requests be fulfilled using addresses from a different subset B of the available valid addresses. Note that any desired number of subsets may be specified by a client, with respective proportions or percentages indicated for each in some embodiments. An MDNRS client may modify the proportions over time as needed. The use of such proportionality-based criteria may be especially beneficial when the software/hardware of the traffic destination servers of the domain is being upgraded, and the domain administrator does not wish to expose all domain users to an upgraded version at the same time, as discussed below in further detail.

In one embodiment, a repeatability requirement 214 may indicate whether, if a given domain name requester resubmits a request to resolve the same domain name, the same address should be provided in response. In order to implement such repeatability requirements, in at least some embodiments the MDNRS may have to retain information about the sources of various name resolution requests and the specific addresses that were provided to the name resolution requests. In some embodiments, clients may indicate preferences 216 regarding name-to-address mapping lifetimes (also known as time-to-live or TTL settings). Such lifetime information may be used, for example, to determine how long a given domain name to address mapping should be retained at an intermediary name resolver. Using shorter TTLs may increase the workload of the MDNRS name resolvers, but may have the benefit of increasing the probability that different end users are provided with different addresses for the domain. In some embodiments, one or more requester identity-based criteria 218 may be used—e.g., if the submitter of a name resolution belongs to a first subset of end users, an address from a first subset of addresses may be provided, and so on.

A number of traffic destination property based factors may be used, e.g., in addition to or instead of request based criteria in some embodiments. For example, an MDNRS may collect traffic destination health information (e.g., indicating the resource utilization levels and/or responsiveness of different destinations) via an intermediary monitoring service in some embodiments, and choose addresses based on the relative health of different destinations when health-based criteria 250 are employed. In one implementation, the destination servers may be ranked in order of decreasing healthiness or responsiveness based on some recent time interval, and addresses of servers that lie in the top K % of the ranking may be provided in preference to addresses of the remaining destination servers. Similarly, in one embodiment, the latency associated with responding to application requests by different destination servers may be monitored, and in accordance with latency-based criteria 252, the addresses provided in response to name resolution requests may be selected based on the latencies measured for the corresponding destinations. A destination latency-based criterion 252 may indicate that an address of a destination server whose response latency is in the top 25% shortest latencies measured over the last T minutes should be selected, or that an address of any destination server whose response latency is at most M milliseconds may be selected. In some embodiments, a destination location-based criterion 254 may be employed—e.g., for requests originating in a particular geographical region, an address of a destination in that region may be selected preferentially if available. In at least some embodiments, destination-based and request-based factors or criteria may be used collectively to respond to a given name resolution request, and the relative priorities 270 of the different factors/policies may be indicated programmatically by a client of the MDNRS. In at least some embodiments, as mentioned earlier, historical name resolution records 272, indicating which addresses were provided earlier in response to respective name resolution requests, may be used as part of stateful name resolution techniques at an MDNRS. Other factors than those shown in FIG. 2 may be employed to respond to name resolution requests in some embodiments.

Example Use of IPv6 Address Pools

Figure 3:
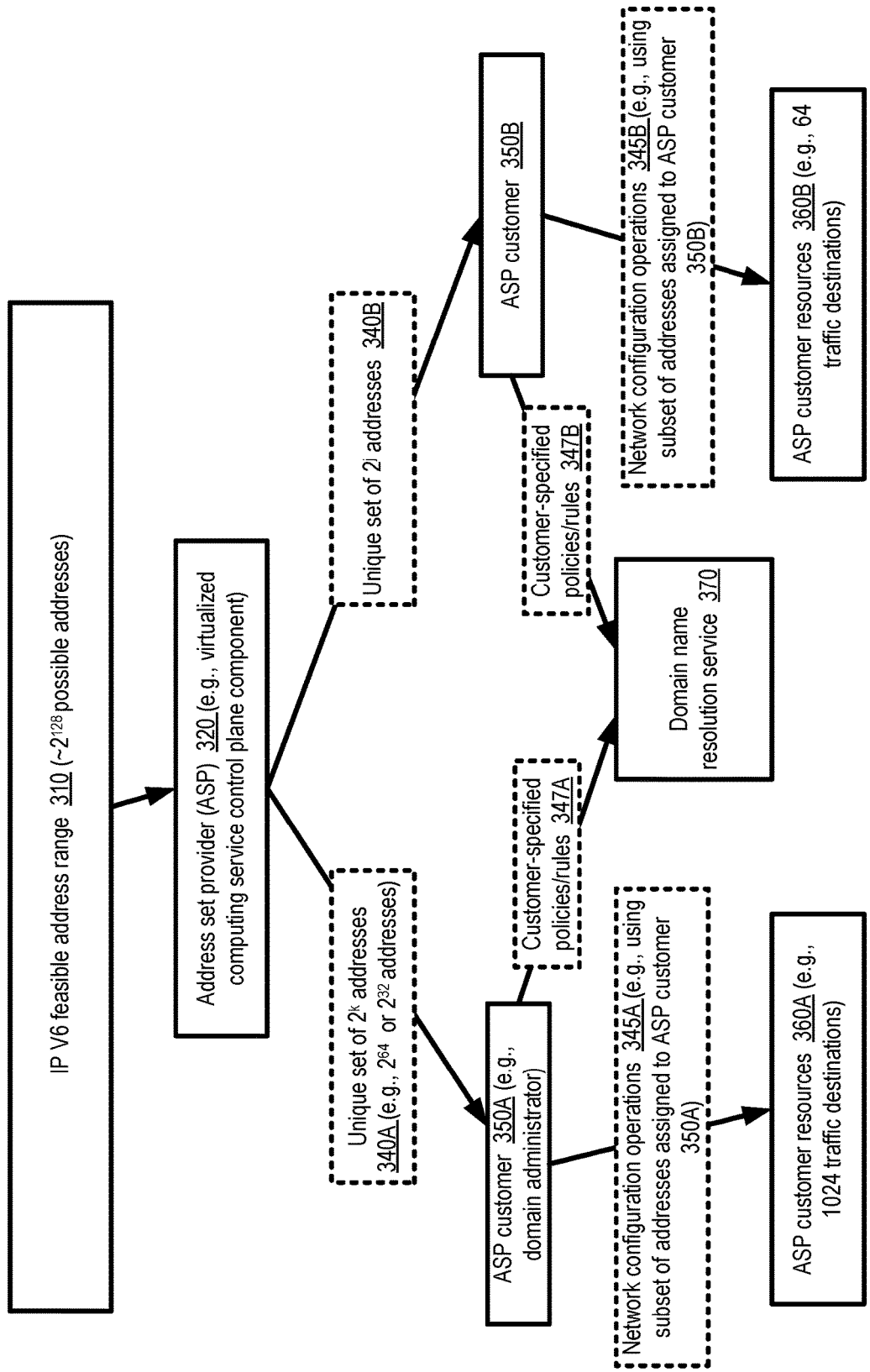
FIG. 3 illustrates an example use of large disjoint sets of Internet Protocol version 6 (IPv6) addresses at a domain name resolution service based on customer-specified rules, according to at least some embodiments.

In Version 6 of the Internet Protocol, 128-bit addresses may be assigned to destination servers, thus providing a much larger pool of addresses than were feasible with the 32-bit addresses of the version used earlier (IP version 4). FIG. 3 illustrates an example use of large disjoint sets of Internet Protocol version 6 (IPv6) addresses at a domain name resolution service based on customer-specified rules, according to at least some embodiments.

An address set provider (ASP) 320, such as a control plane component of a virtualized computing service or some other entity authorized to assign IP addresses, may identify unique sets 340 of IP version 6 addresses 310 and provide them to respective ASP customers 350, such as customers 350A or 350B. The customers may, for example, be domain administrators or customers of a virtualized computing service responsible for networking configuration decisions of a group of virtual machines. In the depicted example scenario, $2^k$ addresses 340A may be provided to ASP customer 350A, while $2^j$ addresses 340B may be provided to ASP customer 350B. In some cases the numbers of addresses provided to an ASP customer may be quite large—e.g., a block of $2^{32}$ or $2^{64}$ addresses may be provided. Different ASP customers may request different numbers of addresses in some embodiments, depending on their needs—e.g., customer 350A may ask for and obtain $2^{64}$ addresses, while customer 350B may only ask for and obtain $2^{16}$ addresses. In at least some embodiments, the addresses provided to an ASP customer may not necessarily be contiguous—e.g., a customer 350 may request and obtain a set $2^q$ of non-continuous addresses.

Having obtained the addresses, the ASP customers may perform at least two types of networking administration tasks in the depicted embodiment. Networking configuration operations 345A and 345B may involve assigning respective IP addresses from the obtained sets 340 to ASP customer resources 360. For example, in one scenario 1024 addresses of the $2^k$ addresses 340A may be assigned to 1024 traffic destinations 360A belonging to ASP customer 350A, while 64 addresses of the $2^j$ addresses 340B may be assigned to 64 traffic destinations 360B managed by ASP customer 350B. In some cases, as indicated earlier, multiple IP addresses may be assigned to individual destination servers or virtual machines. In the second type of administration task, customer-specified policies/rules 347 (e.g., 347A or 347B) may be provided programmatically to a domain name resolution service 370 (similar in functionality to MDNRS 110 of FIG. 1) in the depicted embodiment, so that application or service requests directed to respective domain names of ASP customer 350A and 350B can be mapped to the appropriate IP addresses. In some embodiments, the information provided to the domain name resolution service may include individual criteria (such as some combination of the example factors shown in FIG. 2) that can be translated into a set of rules or policies to be implemented for name resolution at the service 370. Note that although FIG. 3 indicates IP version 6 as the networking protocol being used, the described name resolution techniques may be used with any desired networking protocol or addressing scheme in different embodiments.

Example Mitigation of Denial of Service Attacks

Figure 4:
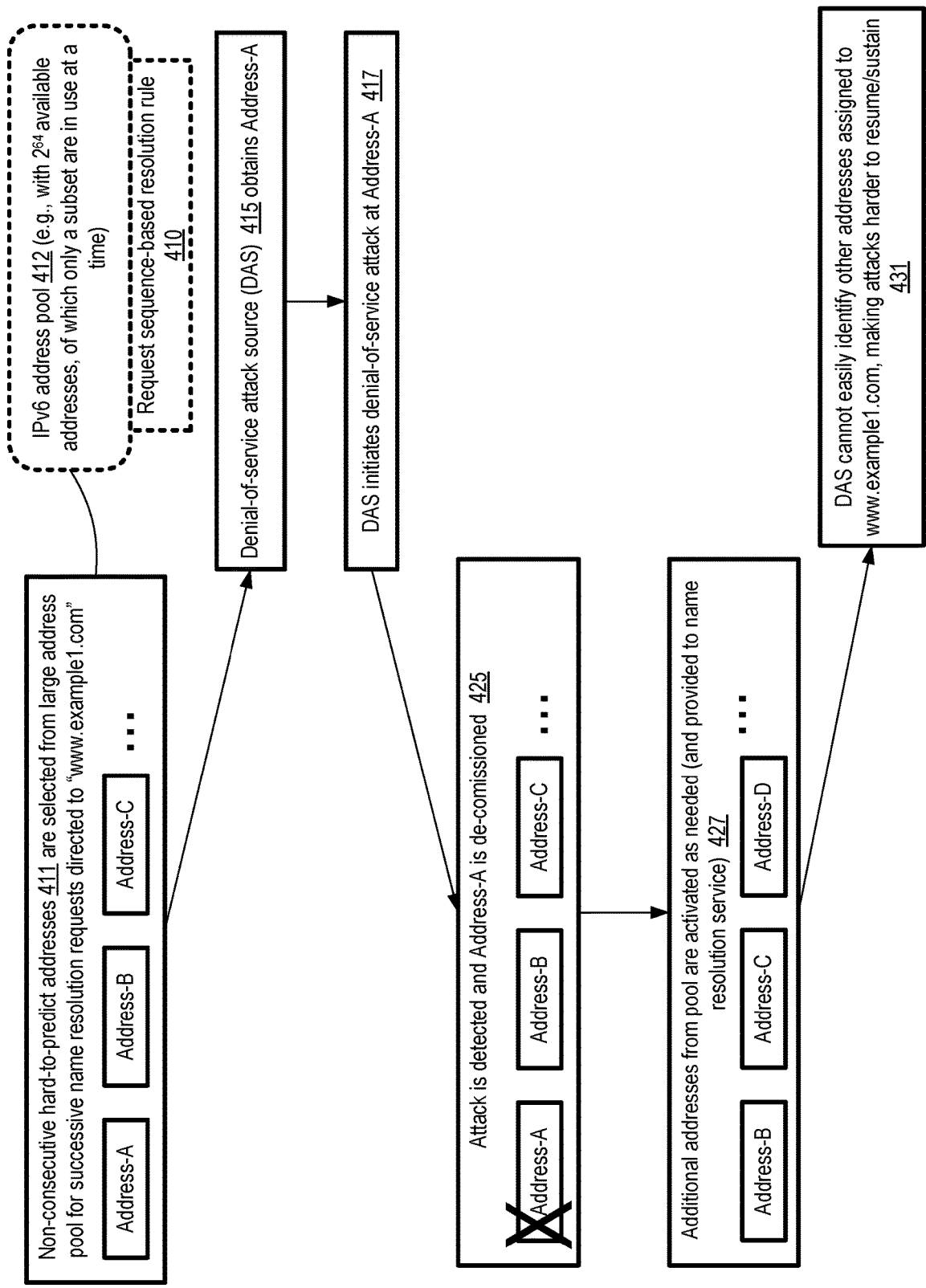
FIG. 4 illustrates an example use of a request sequence-based name resolution rule to mitigate denial of service attacks, according to at least some embodiments.

FIG. 4 illustrates an example use of a request sequence-based name resolution rule to mitigate denial of service attacks, according to at least some embodiments. In a denial of service attack directed to a service or application associated with a given domain name such as "www.example1.com", the attacker may attempt to identify network addresses associated with the domain, and then send large numbers of messages to the identified network addresses.

In the depicted embodiment, an IPv6 address pool 412 (e.g., with $2^{64}$ available addresses, of which only a subset are in use or valid at a given point in time) may be assigned to the www.example1.com domain, and a request sequence-based name resolution rule 410 may be configured for the domain. The rule 410 may for example, require name resolvers to choose randomly selected addresses (from among the valid subset) for successive requests, or to ensure than at least a minimum specified difference exists between successive addresses provided for the domain name. As a result of enforcing the policy 410, non-consecutive (and consequently hard-to-predict) addresses 411, such as Address-A, Address-B and Address C may be selected from the address pool for successive name resolution requests for the domain.

A denial of service attack source (DAS) 415 may obtain Address-A of the domain, and initiate an attack as indicated in element 417. The attack may be detected fairly quickly, e.g., based on monitoring the amount of traffic directed to Address-A, as indicated in element 425, and Address-A may be de-commissioned by the administrator of the domain. For example, the domain name resolution service may be notified to stop providing Address-A in response to name resolution requests, the server(s) processing requests directed to Address-A may be paused or temporarily detached from the network, and so on. Additional addresses (such as Address-D) from the available pool may be activated as needed, and provided to the name resolution service in use, as indicated by element 427. Because of the use of the request sequence-based name resolution criteria and the availability of a large number of addresses, the denial of service attack source may be prevented from easily identifying or guessing other addresses assigned to the domain, thereby making the attack harder to resume or sustain (element 431). In contrast, if a simpler policy which resulted in the selection of consecutive addresses were used, or if the total number of addresses assigned to the domain were small, the denial of service attack may be more sustainable, potentially resulting in the destination servers of the domain not being able to process legitimate requests.

Example Facilitation of Version Transitions

Figure 5:
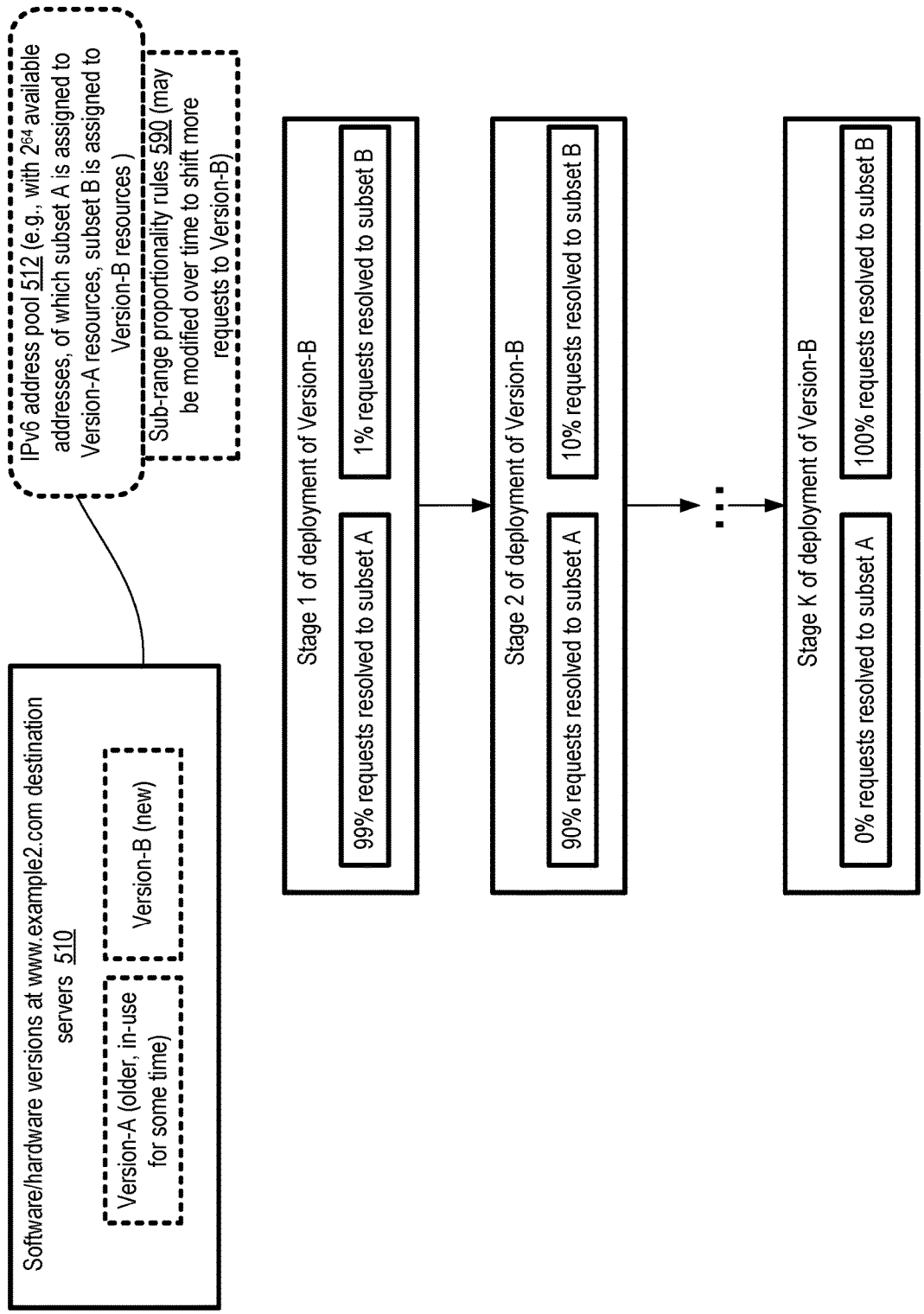
FIG. 5 illustrates an example use of a proportionality name resolution rule to facilitate a gradual transition from one version of a software/hardware stack to another, according to at least some embodiments.

FIG. 5 illustrates an example use of a proportionality name resolution rule to facilitate a gradual transition from one version of a software/hardware stack to another, according to at least some embodiments. In the depicted embodiment, an IPv6 address pool 512 with a large number of addresses may be designated for a domain www.example2.com. The destination servers of the domain may comprise two versions of hardware/software stacks 510: Version-A which has been in use for some time period, and a newer version Version-B which is to be gradually introduced into the production environment of the service or application being supported at the domain. A subset A of the address pool 512 may be assigned to destinations with version A of the hardware/software stack, and a different subset B of the address pool may be assigned to destinations with version B of the hardware/software stack. One or more subset proportionality rules 590 or subset proportionality criteria may be utilized for selecting the addresses to be provided to name resolution requests directed at www.example2.com.

In stage 1 of a gradual transition from version A to version B, the rule 590 may require 99% of name resolution requests for the domain www.example2.com to be directed to subset A of the addresses, while the remaining 1% of requests may be provided addresses from subset B in the depicted embodiment. As more data is collected regarding the customer response and/or feedback with respect to version B, the proportionality rule that is in effect may be modified to shift more of the traffic to subset B (assuming that the quality of version B is found acceptable). For example, in stage 2, 90% of the requests may be directed to subset A, with 10% directed to subset B. Eventually, all the name resolution requests for the domain may be fulfilled by providing subset B addresses in stage K of the deployment of version B in the depicted example scenario. The ability to modify, using name resolution rules or policies, the fraction of requests that are directed to respective versions of the hardware/software stack implementing a service or application without having to change other configuration properties of the service or application may reduce the risks associated with deploying new versions in a production environment substantially by making such transitions gradual. In at least one embodiment, a time-varying name resolution policy may be specified by a client of an MDNRS, indicating how a given rule's parameter values (e.g., the fraction of addresses to be selected from a respective subset of the available addresses) are to change over time.

Example Programmatic Interactions

Figure 6:
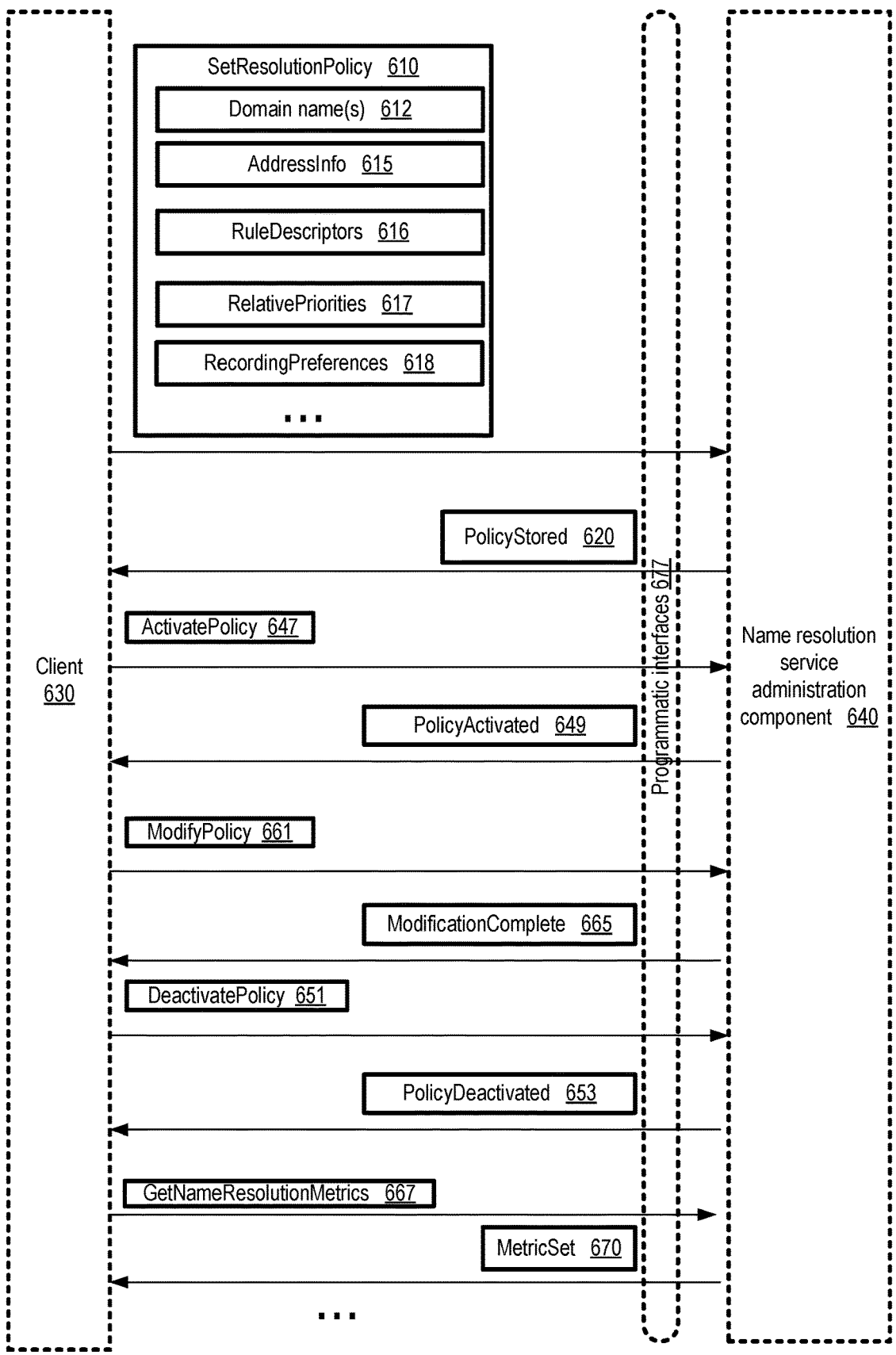
FIG. 6 illustrates example name resolution related programmatic interactions, according to at least some embodiments.

FIG. 6 illustrates example name resolution related programmatic interactions, according to at least some embodiments. In the depicted embodiment, administration or control plane components 640 of a name resolution service, similar in features and functionality to the MDNRS 110 introduced in FIG. 1, may implement a set of programmatic interfaces 677. The interfaces may include, for example, a set of application programming interfaces (APIs), command line tools, graphical user interfaces and/or web-based consoles.

Using the programmatic interfaces 677, a client 630 of the name resolution service (such as an administrator of a domain, or an administrator of a set of destination servers of a domain) may submit several types of requests to an administration component 640 of a name resolution service, and receive corresponding responses. For example, a SetResolutionPolicy request 610 may be submitted to indicate client preferences regarding various aspects of domain name resolution techniques to be implemented in the depicted embodiment. Parameters of a SetResolutionPolicy request 610 may include, for example, one or more domain names 612, an indication of a set of network addresses 615 associated with the domain names, and/or descriptors 616 of one or more name resolution rules or criteria. In one simple example scenario, a policy may comprise only a single rule, so only a single rule descriptor may be required. In scenarios in which multiple rules such as one or more destination-property-based rules and one or more request-property-based rules are specified, the priorities 617 of the rules relative to one another, or an indication of the order in which the rules should be applied to narrow down the set of available addresses, may optionally be provided as well. For example, the relative priority information may indicate that, if both a destination-property-based rule and a request-sequence-based rule is indicated, the destination-property-based rule should be applied first to narrow down the possible addresses to be provided to fulfill a request, and then the request-sequence-based rule should be applied within the narrowed-down subset. Note that if prioritization preferences are not provided and multiple rules are indicated, the name resolution service may apply the rules in an order selected at the service in various embodiments. The RecordingPreferences parameter may, for example, indicate whether and how long records of the responses provided to various name resolution requests are to be retained and/or made accessible via other programmatic interfaces.

The rule descriptors 616 may indicate, for example, details of one or more factors or criteria (such as a criterion indicating the minimum differences between successive addresses provided for a given domain, or the proportion/fraction of responses that are to comprise addresses selected from specified subsets of the address pool) to be considered when selecting addresses to be provided to respond to a name resolution request. Several different request-property-based factors and/or destination-property-based factors (e.g., some combination of the factors discussed in the context of FIG. 2) may be indicated in a rule descriptor in some embodiments, along with specific guidance or instructions as to how exactly the factors or criteria should be utilized. In at least one embodiment, a client may include executable code or source code (e.g., a script, or a program comprising one or more address selection functions) that can be used to select individual addresses from the addresses indicated in the AddressInfo parameter 615. In one embodiment, a client 630 may include only the currently valid (i.e., in-use) set of addresses in the address information provided in the request 610. In other embodiments, a pool of addresses that includes currently valid addresses as well as addresses that are not currently in use may be provided, together with an indication of how the subset of valid addresses can be determined.

In response to a SetResolutionPolicy request 610, the administration component 640 may check the provided parameters for consistency and correctness (e.g., to determine whether any of the rules are mutually contradictory, whether enough valid addresses are available in the address set to permit the policies to be enforced, whether the domain name is already in use, and so on). If the parameters are found acceptable, the information included in the request may be stored in one or more repositories, and a PolicyStored response message 620 may be provided; if the parameters are not acceptable, an error message may be sent to the client instead. In some embodiments, identifiers of one or more records stored at the repositories for the policies and domains indicated in the SetResolutionPolicy request may be included in the PolicyStored response.

After a policy has been accepted and stored at the name resolution service, in some embodiments a client 630 may submit an ActivatePolicy request 647, specifying a policy that was stored earlier, to cause the MDNRS to start enforcing the policy. In response, a PolicyActivated message 649 may be transmitted to the client to indicate that the policy is now in use. In other embodiments, a separate ActivatePolicy request may not be needed, and the MDNRS may immediately start using a policy after the PolicyStored response is provided to a SetResolutionPolicy request. In some embodiments, a DeactivatePolicy request may be submitted to cause the MDNRS to stop applying or enforcing a specified name resolution policy, and a PolicyDeactivated message 653 may be sent after the use of the policy has been terminated. Note that because some name resolvers may already have cached mappings between a domain name and an IP address based on a previously-activated policy at the time that deactivation is requested, it may take some time for the deactivation to take full effect even if the MDNRS stops using the policy for new requests as soon as it is requested to do so.

A client 630 may change ae policy programmatically by submitting a ModifyPolicy request 661 in some embodiments. Such a request may indicate the domain whose policy is to be modified, and/or the specific policy being modified (e.g., using a policy identifier obtained in response to the SetResolutionPolicy request), as well as the change to be made. Any combination of a number of different categories of changes may be requested in different embodiments— e.g., the set of valid addresses to which the policy is applicable may be modified, the percentages of responses to be provided from respective subsets of the valid addresses may be changed, and so on. After the requested changes (if approved) are applied, a ModificationComplete message 665 may be transmitted in at least one embodiment to the client.

In some embodiments, one or more types of metrics pertaining to name resolution may be stored at the service, and a GetNameResolutionMetrics request 667 may be used to obtain the metrics. Such metrics may include, for example, measures of the rate at which name resolution requests were received over some time interval, information about the sources from which such requests were received and the addresses that were provided, and so on. The requested metrics may be supplied in a MetricSet message 670 in the depicted embodiment. In some embodiments, a client may programmatically request information about the set of addresses that were provided to a specified end user or a range of end user addresses, and the set of addresses may be provided in response. In one embodiment, a client 630 may submit a programmatic query indicating a particular address associated with a domain name, and an indication of one or more request sources to which the particular address was provided in response to respective requests to resolve the domain name may be provided. Other types of programmatic interactions, not shown in FIG. 6, may be supported in at least some embodiments.

Example Provider Network Environment

Figure 7:
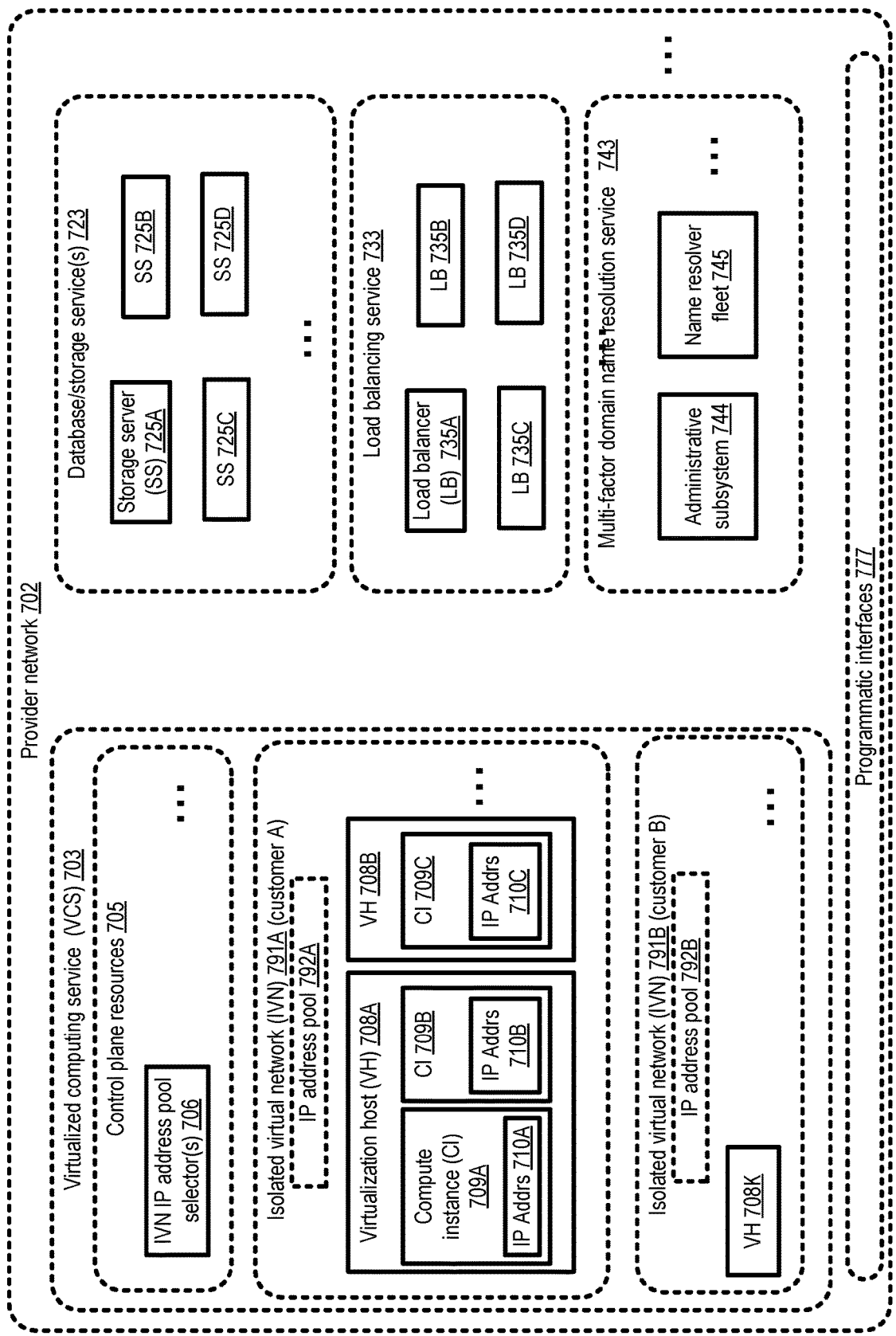
FIG. 7 illustrates an example provider network at which a multi-factor domain name resolution service may be implemented, according to at least some embodiments.

FIG. 7 illustrates an example provider network at which a multi-factor domain name resolution service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks. A provider network may sometimes be referred to as a "public cloud" environment. Resources of a provider network (including, in some cases, the resources implementing a given network-accessible service of a provider network) may often be distributed among several data centers, and the data centers themselves may be distributed across several cities, states, countries or continents.

The services implemented at provider network 702 in the depicted embodiment may include, for example, a virtualized computing service (VCS) 703, one or more database/storage service(s) 723, a load balancing service 733, and a multi-factor domain name resolution service 743 similar in features and functionality to MDNRS 110 of FIG. 1. Numerous other services may also be implemented at the provider in at least some embodiments.

At the VCS 703, a plurality of compute instances (CIs) 709, such as guest virtual machines with different client-selected performance capabilities, may be established on behalf of VCS clients at a collection of virtualization hosts (VHs) 708. For example, CIs 709A and 709B may be launched at a virtualization host 708A, CI 709C may be set up at virtualization host 708B, and so on. Such compute instances may be used to implement one or more applications or services by some VCS clients; as such, the compute instances 709 may represent one example of traffic destination servers of such applications or services. As part of the network configuration of the resources assigned to VCS clients, one or more public or private IP addresses may be assigned to individual ones of the compute instances—e.g., IP addresses 710A may be assigned to CI 709A, IP addresses 710B may be assigned to CI 709B, and IP addresses 710C may be assigned to CI 709C in the depicted embodiment.

In some embodiments, respective isolated virtual networks (IVNs) 791 may be established on behalf of various clients at the VCS, and the CIs may be set up at the request of the clients within the IVNs. For example, IVN 791A (at which CIs 710A, 710B and 710C are launched) may be established on behalf of customer A of the VCS, and IVN 791B (comprising at least one VH 708K) may be established on behalf of customer B. An isolated virtual network may comprise a collection of networked resources (including compute instances 709) allocated to a given client, which are logically isolated from (and by default, inaccessible from) resources allocated for other clients in other isolated virtual networks. The client on whose behalf an IVN is established may be granted substantial flexibility regarding network configuration for the resources of the IVN—e.g., private IP addresses for application compute instances may be selected by the client without having to consider the possibility that other resources within other IVNs may have been assigned the same IP addresses, subnets of the client's choice may be established within the IVN, security rules may be set up by the client for incoming and outgoing traffic with respect to the IVN, and so on. In the depicted embodiment, when an IVN 791 is established, control plane or administrative resources of the VCS 705 (e.g., address pool selectors 706) may assign a pool of IP addresses to that IVN. For example, IP address pool 792A may be assigned to IVN 791A, and IP address pool 792B may be assigned to IVN 791B. In some embodiments, when requesting an IVN, a client of the VCS may indicate whether IP version 6 addresses or IP version 4 addresses are to be used for the compute instances set up in the IVN, and the number of IP addresses to be assigned in the pool 792 for the IVN. From among the addresses of the IVN's pool 792, individual addresses (or groups of addresses) may be assigned as public addresses of individual compute instances (i.e., as addresses that can be used to send network traffic from outside the IVN to the compute instances, e.g., using the public Internet).

The addresses of a given pool 792 of an IVN 791 may be associated with a publicly-accessible domain name such as www.example.com in some embodiments. Such a domain name may be used to access a service or application being implemented at the IVN by a VCS customer. In some embodiments, the compute instances 709 at which a given service or application associated with a domain name is implemented may have one or more load balancers 735 (e.g., 735A-735D) configured to distribute incoming requests. Such load balancers 735 may be implemented as part of a separate load balancing service 733 of the provider network in the depicted embodiment. Information about the domain name, the available addresses (including load balancer addresses) to which requests directed at the domain name should be sent, and the name resolution rules and policies to be used for the domain name may be sent to the multi-factor domain name service 743 by VCS clients on whose behalf the domain names are assigned, e.g., using the kinds of programmatic interactions discussed in the context of FIG. 6. The domain name service 743 may include an administrative subsystem 744 (at which repositories of name resolution policies and related information may be maintained) as well as a name resolver fleet 745 similar in functionality to fleet 114 of FIG. 1.

A database/storage service 723 may comprise a plurality of storage servers 725 (e.g., 725A-725D), at which database instances of various types (relational, object-oriented, key-value-based, and so on) and/or other types of storage objects may be set up on behalf of clients in various embodiments. In at least one embodiment, a storage service 723 may comprise an object storage service that allows users to store unstructured data objects of arbitrary size, which can be retrieved using web services interfaces. The storage servers 725 may, for example, be used to store records indicating the set of addresses assigned to various domain names.

Individual ones of the services of provider network 702 may expose respective sets of programmatic interfaces 777 to its clients in the depicted embodiment. In general, several of the services may utilize resources of other services (for example, the name resolver fleet may also utilize compute instances of the virtualized computing service 703 and storage devices provided by the database/storage services 723). As such, various services of provider network 702 may act as clients of other services, and may utilize the programmatic interfaces of the other services in the depicted embodiment. Such programmatic interfaces may also be used by clients of the provider network to submit name resolution related requests (similar to those discussed in the context of FIG. 1 and FIG. 6) in at least one embodiment. In some embodiments, at least some of the techniques discussed above for implementing multi-factor domain name resolution may be implemented at resources that are not part of network-accessible services such as those shown in FIG. 7.

Methods for Multi-Factor Domain Name Resolution

FIG. 8 is a flow diagram illustrating aspects of operations that may be performed to implement multi-factor name resolution, according to at least some embodiments. As shown in element 801, a set of network addresses for a collection of destination resources associated with a domain name such as www.<some-name>.com may be obtained. The set of addresses may be referred to as an address pool in some embodiments. In some cases, the addresses may be IP version 6 addresses; in other cases, IP version 4 addresses or addresses associated with other standard or proprietary networking protocols may be obtained. In some embodiments, the addresses may be obtained from a control plane component of a provider network service, such as a virtualized computing service similar to VCS 703 discussed in the context of FIG. 7. A VCS may enable a client to establish an isolated virtual network (IVN) similar to IVNs 791 shown in FIG. 7, for example, at which an application or service associated with the domain name is to be implemented. A set of public IP addresses (i.e., addresses that are advertised on, and accessible from, the public Internet) may be provided as part of the configuration of such an isolated virtual network in one such embodiment, and the VCS client may assign various ones of the IP addresses to compute instances launched within the IVN. In some embodiments, a domain administrator or a VCS client may submit a request for a desired number of network addresses to an authorized address source, and receive the addresses in response to such a request. In one embodiment, non-contiguous network addresses may be obtained on request from an address source; in other embodiments, one or more blocks of contiguous addresses may be obtained. Note that in at least some cases, the number of addresses obtained may be much larger than the number of distinct addressable resources (e.g., VCS compute instances, non-virtualized servers, etc.) to which the addresses are to be assigned. In some embodiments, multiple addresses from the address pool may be assigned to the same destination resource, and all the assigned addresses for the resource may be propagated via gateway protocols such as BGP or other routing-related protocols.

A request to configure name resolution rules and/or policies for the domain name may be received, e.g., at a multi-factor domain name resolution service (MDNRS) from a client of the service in various embodiments (element 804). The request parameters may indicate, for example the domain name, the set of addresses to which the domain name may be mapped, one or more request sequence based address selection criteria or rules, one or more destination property based address selection criteria or rules, and/or name-to-address mapping lifetime preferences (e.g., time-to-live properties for the mappings) in different embodiments. In some embodiments in which multiple rules are provided to the MDNRS, relative priorities of the rules may also be provided, as well as directives or guidance indicating how to deal with scenarios in which it may no longer be beneficial or feasible to apply a given rule (e.g., the client may indicate actions to be taken if the application of a rule would result in the selection of an address that is assigned to a non-responsive, overloaded, or unhealthy destination resource).

A request sequence based address selection criterion may specify a requirement for a difference between addresses provided in response to respective requests in some embodiments. If IPv6 addresses are used, for example, in which a given address may be represented by a sequence of eight sixteen-bit hexadecimal values, a difference requirement equivalent to the following may be indicated by the MDNRS client in one example scenario: the MDNRS is to keep track of the most recent N addresses provided, ensure that each of the N addresses differs from the remaining (N−1) addresses in at least two hexadecimal values, and that among the pairs of non-zero hexadecimal values in the same position (e.g., the first position through the eighth position) in the N different addresses, no two hexadecimal values are to be consecutive. Other types of request sequencing based rules may be indicated in some embodiments—e.g., a rule may indicate that every Nth request is to be provided a response containing an address from a randomly selected subset of the address pool, while the addresses provided for the remaining N-1 requests of the N requests may be consecutive with respect to at least one of the hexadecimal values. In some embodiments, a client of the MDNRS may provide a function or program that can be executed at the MDNRS to determine the addresses to be provided, or may indicate that a random selection function is to be used. In at least one embodiment, a request-property-based rule that is not necessarily dependent on sequencing of requests may be indicated: e.g., addresses may be selected based on the identity of the entity which submits the name resolution request. Note that at least in some embodiments, even if a domain name resolution request is routed to the MDNRS via an intermediary (such as the intermediary name resolvers 154 shown in FIG. 1), information about the source of the request (such as the IP address of the device from which the request was received at the intermediary) may be provided to the MDNRS, and such source-identifying information may be used to select the address to be provided. In at least some embodiments, an address subset proportionality rule or criterion may be specified by an MDNRS client. In such a scenario, the set of addresses available for the domain may be divided into subsets {S1, S2, . . . }, and a proportionality criterion indicating that respective specified fractions of requests (e.g., 90%, 5%, . . . ) are to be satisfied using addresses from respective subsets may be used to select addresses for received name resolution requests. In some embodiments, a combination of subset proportionality, request-sequence-based and/or other rules may be used.

A variety of destination-property based rules may be indicated in different embodiments. For example, in some embodiments, the MDNRS may have access to results of latency tests associated with different destination resources (such as servers) of the domain, and/or to results of health monitoring algorithms being implemented for the destination resources. In such embodiments, a destination-property-based rule or criterion may indicate that an address should be selected from among the addresses of the destinations with latencies in the lowest 25% measured latencies in the last T minutes, or that an address of a destination server whose health metrics meet a specified requirement should be selected. In various embodiments, name resolution policies indicating a plurality of rules to be applied, as well as the relative priority or sequence in which the rules should be applied to narrow down the set of addresses for a given name resolution request may be stored as part of the metadata of an MDNRS.

In some embodiments, as shown in element 807, name resolution rules or criteria may be modified dynamically in response to change requests received from MDNRS clients. In some cases the set of valid addresses of the domain (i.e., addresses that are currently assigned to destination resources that are configured to receive and process network messages) may also be modified over time.

A request to resolve a domain name (i.e., to provide one or more addresses corresponding to the domain name) may be received at the MDNRS (element 808). In some cases, the request may indicate that a specified number of distinct addresses should be provided if possible. Based at least in part on the current set of rules/policies in effect at the time that the request is received, one or more addresses from the current set of valid addresses for the domain may be selected (element 810). In at least some embodiments, a combination of request-sequence-based or request-property-based, as well as destination-property-based rules may be utilized to select an address corresponding to a given request. The selected address(es) may then be transmitted to the requester (element 813).

It is noted that in various embodiments, at least some operations other than those illustrated in the flow diagram of FIG. 8 may be used to implement the name resolution techniques described above. Some of the operations shown may not be implemented in some embodiments or may be implemented in a different order, or in parallel rather than sequentially.

Use Cases

The techniques described above for supporting and utilizing multi-factor domain name resolution policies may be useful in a variety of scenarios. By using characteristics or properties of the requests or requesters, as well as properties or status of the destination resources to which the addresses of a domain are assigned, the security of the applications or services being implemented at the domain may be enhanced, e.g., by reducing the probability of sustained denial of service attacks. Also, in scenarios where a gradual transition from one version of a service or application to another is desired in a production environment, the use of the described subset proportionality rules for name resolution may help enable a smoother and more controlled transition, accomplished simply by using dynamically modified name resolution rules, than may otherwise have been feasible.

Illustrative Computer System

Figure 9:
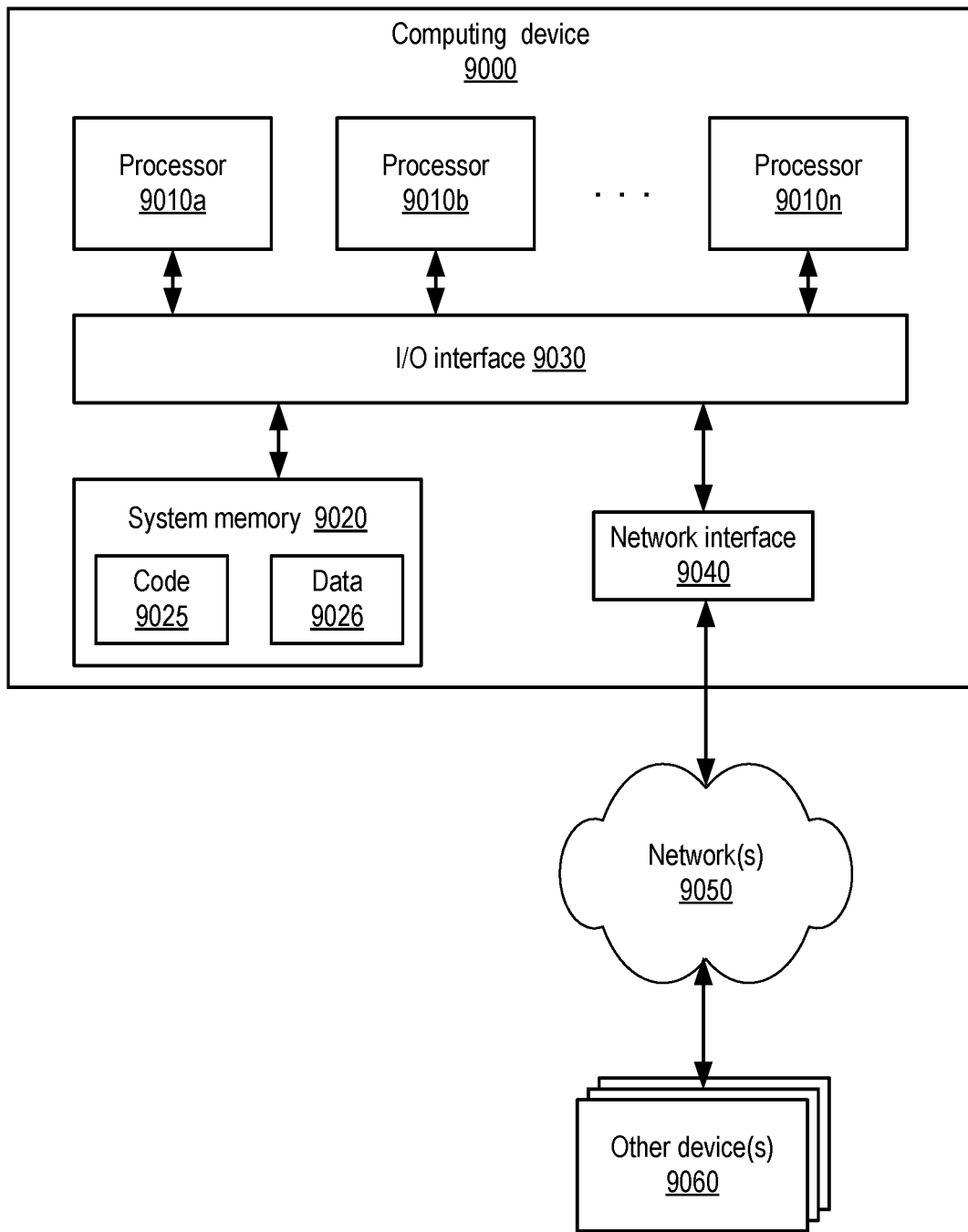
FIG. 9 is a block diagram illustrating an example computing device that may be used in at least some embodiments.

In at least some embodiments, a server that implements a portion or all of one or more of the technologies described herein, including various components of a name resolution service and the like may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030. In at least some embodiments computing device 9000 may include a motherboard to which some or all of such components may be attached.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAIVI), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices of a network-accessible service;
   wherein the one or more computing devices include one or more processors, memory, and instructions that upon execution on or across one or more of the one or more processors cause the one or more computing devices to:
   store, corresponding to a domain name, (a) a plurality of network addresses, wherein one or more of the network addresses are assigned to individual ones of a plurality of network traffic destinations at which one or more applications associated with the domain name are implemented, and (b) a plurality of rules for selecting network addresses from the plurality of network addresses in response to requests to resolve the domain name, wherein the plurality of rules include at least one destination-property-based rule and at least one request-sequence-based rule;
   receive a request to resolve the domain name;
   select, based at least in part on a combination of the at least one destination-property-based rule and the at least one request-sequence-based rule, one or more network addresses from the plurality of network addresses; and
   provide the selected one or more network addresses to a submitter of the request to resolve the domain name.

2. The system as recited in claim 1, wherein the one or more computing devices include further instructions that upon execution on or across the one or more processors further cause the one or more computing devices to:
   obtain, via a programmatic interface from a client of the network-accessible name resolution service, one or more of: (a) the domain name, (b) the plurality of network addresses, (c) the destination-property-based rule, (c) the request-sequence-based rule, or (d) a time-to-live property of a mapping between the domain name and a network address of the one or more network addresses.

3. The system as recited in claim 1, wherein the request-sequence-based rule indicates that network addresses provided in response to respective requests corresponding to the domain name are to differ from one another according to a specified difference requirement.

4. The system as recited in claim 1, wherein the one or more computing devices include further instructions that upon execution on or across the one or more processors further cause the one or more computing devices to:
   store a proportionality rule indicating that a specified fraction of requests to resolve the domain name is to be satisfied using addresses of a subset of the plurality of network addresses; and
   utilize the proportionality rule to identify a network address provided in response to another request to resolve the domain name.

5. The system as recited in claim 1, wherein the one or more computing devices include further instructions that upon execution on or across the one or more processors further cause the one or more computing devices to:
   provide, in response to a programmatic query indicating a particular address of the plurality of addresses, an indication of one or more request sources to which the particular address was provided in response to respective requests to resolve the domain name.

6. A method, comprising:
   performing, at one or more computing devices:
   receiving a request to provide one or more network addresses corresponding to a domain name;
   identifying, based at least in part on a request-sequence-based address selection criterion, the one or more network addresses from a plurality of network addresses associated with the domain name, wherein the request-sequence-based address selection criterion specifies that at least some network addresses selected for different requests for the domain name are selected to be non-consecutive addresses or are selected randomly; and
   providing the one or more network addresses in response to the request.

7. The method as recited in claim 6, further comprising performing, at the one or more computing devices:
   obtaining, via a programmatic interface from a client of a network-accessible service, one or more of: (a) the domain name, (b) the plurality of network addresses, (c) the request-sequence-based address selection criterion, or (d) a time-to-live property of a mapping between the domain name and a network address of the one or more network addresses.

8. The method as recited in claim 6, wherein the request-sequence-based address selection criterion indicates that network addresses provided in response to respective requests corresponding to the domain name are to differ from one another according to a specified requirement.

9. The method as recited in claim 6, further comprising performing, by the one or more computing devices:
   obtaining, via a programmatic interface, an indication of a function to be used to identify the one or more network addresses.

10. The method as recited in claim 6, wherein at least one network address of the one or more network addresses is identified based at least in part on a random selection function.

11. The method as recited in claim 6, wherein the domain name is associated with a plurality of destination servers, and wherein identifying at least one address of the one or more network addresses is based at least in part on a destination-property-based address selection criterion.

12. The method as recited in claim 11, wherein identifying the one or more network addresses comprises:
    identifying a subset of the plurality of network addresses based at least in part on the destination-property-based address selection criterion; and
    selecting the one or more network addresses from the subset based at least in part on the request-sequence-based address selection criterion.

13. The method as recited in claim 11, wherein the destination-property-based address selection criterion includes one or more of: (a) a latency criterion, or (b) a destination server health criterion.

14. The method as recited in claim 6, wherein the plurality of network addresses comprises at least some Internet Protocol Version 6 (IP v6) addresses.

15. The method as recited in claim 6, further comprising performing, at the one or more computing devices:

storing (a) a first record indicating that a first network address of the plurality of network addresses was provided in response to a request from a first source, and (b) a second record indicating that a second network address of the plurality of network addresses was provided in response to a request from a second source; and in response to a programmatic query indicating the first network address, providing an identifier of the first source.

16. One or more non-transitory computer-accessible storage media storing program instructions that when executed on or across one or more processors cause one or more computer systems to:

determine that a request for a network address corresponding to a domain name has been received;

identify the network address from a plurality of network addresses associated with the domain name, based at least in part on a request-property-based address selection criterion specifying identification of the network address based at least in part on an identity of an entity from which the request was received; and cause the network address to be included in a response to the request.

17. The one or more non-transitory computer-accessible storage media as recited in claim 16, storing further program instructions that when executed on or across the one or more processors further cause one or more computer systems to:

obtain, via a programmatic interface from a client of a network-accessible service, one or more of: (a) the domain name, (b) the plurality of network addresses, (c) the request-property-based address selection criterion, or (d) a time-to-live property of a mapping between the domain name and a network that includes the plurality of network addresses.

18. The one or more non-transitory computer-accessible storage media as recited in claim 16, wherein the request-property-based address selection criterion indicates that network addresses provided in response to respective requests corresponding to the domain name are to differ from one another according to a specified requirement.

19. The one or more non-transitory computer-accessible storage media as recited in claim 16, storing further program instructions that when executed on or across the one or more processors further cause one or more computer systems to:

store a proportionality criterion indicating that a specified fraction of name resolution requests directed to the domain name is to be satisfied using addresses of a subset of the plurality of addresses; and utilize the proportionality criterion to identify a network address provided in response to another name resolution request.

20. The one or more non-transitory computer-accessible storage media as recited in claim 16, wherein the domain name is associated with a plurality of destination servers, and wherein the network address is identified based at least in part on a destination-property-based address selection criterion.

* * * * *